United States Patent
Shimizu et al.

(10) Patent No.: US 12,024,467 B2
(45) Date of Patent: Jul. 2, 2024

(54) ARTICLE HAVING GLAZE LAYER

(71) Applicant: TOTO LTD., Kitakyushu (JP)

(72) Inventors: Satoshi Shimizu, Kitakyushu (JP); Ayako Hasegawa, Kitakyushu (JP)

(73) Assignee: Toto Ltd., Kitakyushu (JP)

(*) Notice: Subject to any disclaimer, the term of this patent is extended or adjusted under 35 U.S.C. 154(b) by 545 days.

(21) Appl. No.: 17/213,971

(22) Filed: Mar. 26, 2021

(65) Prior Publication Data
US 2021/0214270 A1 Jul. 15, 2021

Related U.S. Application Data

(63) Continuation of application No. PCT/JP2020/009586, filed on Mar. 6, 2020.

(30) Foreign Application Priority Data

Mar. 8, 2019 (JP) .................. 2019-042553

(51) Int. Cl.
*C03C 8/04* (2006.01)
*C03C 8/02* (2006.01)
(Continued)

(52) U.S. Cl.
CPC ............. *C03C 8/04* (2013.01); *C03C 8/02* (2013.01); *C03C 8/14* (2013.01); *C03C 19/00* (2013.01); *C03C 2209/00* (2013.01)

(58) Field of Classification Search
CPC .... C03C 8/04; C03C 8/02; C03C 8/14; C03C 19/00; C03C 2209/00; Y10T 428/24479
See application file for complete search history.

(56) References Cited

U.S. PATENT DOCUMENTS

| | | |
|---|---|---|
| 6,548,162 B1 | 4/2003 | Machida et al. |
| 10,532,945 B2 | 1/2020 | Shimizu et al. |

(Continued)

FOREIGN PATENT DOCUMENTS

| | | |
|---|---|---|
| CN | 1900021 A | 1/2007 |
| CN | 104016718 A | 9/2014 |

(Continued)

OTHER PUBLICATIONS

Office Action mailed on Nov. 21, 2023 issued in the corresponding Taiwanese Patent Application No. 109107396.

*Primary Examiner* — Catherine A. Simone
(74) *Attorney, Agent, or Firm* — Carrier, Shende & Associates P.C.; Joseph P. Carrier; Fulchand P. Shende (57) ABSTRACT

Disclosed is an article provided with a glaze layer having a mat tone surface having excellent texture. This article is provided with a substrate and a glaze layer provided on the surface of the substrate. The 60° glossiness of the surface of the glaze layer is greater than 20 and equal to or less than 50. The article has properties such that: the coefficient of variation of the root mean square slope (RΔq) of the roughness curve is 0.4-1 inclusive which is obtained by using a stylus type surface roughness measuring device according to JISB0651(2001) under a condition separately specified in JISB0601(2001); and the arithmetic average roughness (Ra) is 0.0-0.5 μm inclusive. The article has softness and warmness, is sensed to be moisturized and have high quality, and has improved touch feeling.

13 Claims, 3 Drawing Sheets

(51) Int. Cl.
*C03C 8/14* (2006.01)
*C03C 19/00* (2006.01)

(56) References Cited

U.S. PATENT DOCUMENTS

2015/0284296 A1    10/2015  Osanai et al.
2018/0251398 A1*    9/2018  Ikegami .................. C03C 17/25

FOREIGN PATENT DOCUMENTS

| | | |
|---|---|---|
| CN | 104798195 A | 7/2015 |
| JP | H08-133870 A | 5/1996 |
| JP | 2001-073435 A | 3/2001 |
| JP | 2012-046364 A | 3/2012 |
| JP | 2018-104272 A | 7/2018 |
| WO | WO-2017043538 A1 * | 3/2017 ........... C03C 17/002 |

* cited by examiner

Fig. 3

ARTICLE HAVING GLAZE LAYER

CROSS-REFERENCE TO RELATED APPLICATIONS

This is a continuation application of International Application PCT/JP2020/009586, filed on Mar. 6, 2020. This application also claims priority to Japanese Application No. 2019-042553, filed on Mar. 8, 2019. The entire contents of each of these prior applications are incorporated herein by reference.

TECHNICAL FIELD

The present invention relates to an article provided with a glaze layer having a matte surface, especially an article provided with a glaze layer having a matte surface with an excellent texture, more specifically a matte surface giving a pleasant texture to a user visually and tactually.

BACKGROUND ART

Articles having a glaze layer on the surface thereof, for example, a sanitary ware have a shiny and glossy appearance which has texture that can evoke high quality and cleanness. Contrary to these, articles having a glossless, matte surface are getting a favorable rating in a market. This is because the matte texture can improve an appearance (designability) of a product, can be harmonized with the texture of wall, equipment, and so forth in the same space, and thereby can have a wider design variation.

JP2012-46364 A (Patent Literature 1) discloses a technique with which the matte surface is formed by precipitating crystal particles at the time when a glaze is baked. It is reported that a surface having a specific physical property can compatibly satisfy both the anti-fouling property and the matte property.

JP2018-104272 A (Patent Literature 2) describes a technique with which a surface having both the matte property and the anti-fouling property can be obtained by blasting a glaze surface.

Including these techniques, there are still needs to further improve a conventional matte glaze layer surface so as to obtain a matte glaze layer surface having an excellent texture.

CITATION LIST

Patent Literature

Patent Literature 1: JP2012-46364 A
Patent Literature 2: JP2018-104272 A

SUMMARY OF THE INVENTION

Technical Problems

We have found that a glaze layer surface provided with a specific surface property becomes a matte surface having an excellent texture, and further found that such a glaze layer surface becomes a matte surface capable of giving visually and tactually a pleasant texture to users.

Accordingly, an object of the present invention is to provide an article provided with a glaze layer having a matte surface with an excellent texture.

Solution to Problems

Therefore, an article according to the present invention comprises:

a substrate and a glaze layer formed on a surface of the substrate;
the surface of the glaze layer has:
a 60° glossiness being in the range of more than 20 to 50 or less; and
by using a stylus type surface roughness tester in accordance with JIS B0651 (2001) and are stipulated in accordance with JIS B0601 (2001);
a variation coefficient of a root mean square slope of a roughness curve (RΔq) being in the range of 0.04 to 0.1; and
an arithmetic average roughness (Ra) being in the range of 0.0 µm to 0.5 µm, where
measurement conditions to obtain the variation coefficient of RΔq are: an assessment length; 0.8 µmm, a cut-off value λc; 0.8 µmm, a cut-off value λs; 0.0025 µmm, a filter class; Gaussian, correction of a cross-sectional curve; tilt correction (entire), and the RΔq values of 10 arbitrary locations inside an area of 50 µmm×50 µmm are measured thereby calculating an average value and a standard deviation thereof to obtain the standard deviation/average value as the coefficient; and
measurement conditions to obtain the Ra value are: an assessment length; 15 mm, a cut-off value λs; 1 µmm, a cut-off value λc; 3 µmm; a filter class; Gaussian, correction of a cross-sectional curve; tilt correction (entire), and the Ra values of 5 arbitrary locations inside an area of 50 µmm×50 µmm are measured to obtain the average value as the Ra value.

DESCRIPTION OF THE EMBODIMENTS

Definition

Figure 1:
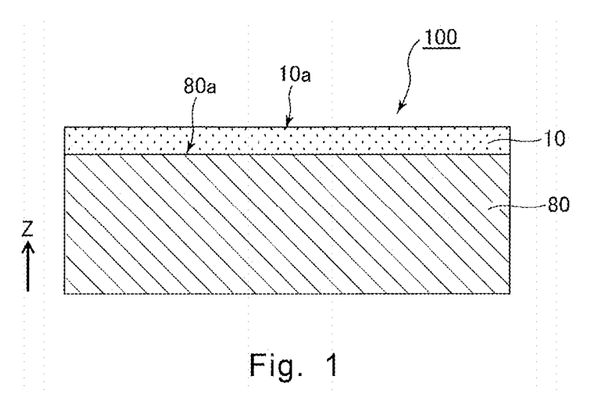
FIG. 1 is a schematic cross-sectional view to explain the article according to the present invention.

FIG. 1 is the schematic cross-sectional view to explain the article according to the present invention. In the present invention, "an article provided with a glaze layer" means, as illustrated in FIG. 1, an article 100 that is provided with a glaze layer 10 on a surface 80a of a substrate 80. There is no particular restriction in the article so far as the article has this basic structure, though enameled products and ceramics provided with the glaze layer are preferable. Here, ceramics are more preferable, while sanitary wares are still more preferable among the ceramics. In the present invention, the substrate 80 is preferably formed of an inorganic material, while the substrate formed of a metal, a glass, a cement, a base material of a ceramics, and the like are more preferable. Specific examples of the article include ceramic products that are used around a toilet and a washroom, though they are preferably a washbowl in a washstand, a hand washer, a closet bowl, a urinal, a perforate plate of a toilet bowl, a toilet tank, and the like.

Surface Properties

With regard to the properties possessed by the glaze layer surface of the article according to the present invention, firstly, a glossiness of the surface of the glaze layer is in the range of more than 20 to 50 or less, as the 60° glossiness.

The next property is as follows. Namely, a variation coefficient of a root mean square slope of a roughness curve (RΔq) is in the range of 0.04 to 0.1, and
an arithmetic average roughness (Ra) is in the range of 0.0 μm to 0.5 μm, where
these indicators are measured by using a stylus type surface roughness tester in accordance with JIS B0651 (2001) and stipulated in JIS B0601 (2001).

More preferably, the variation coefficient of a root mean square slope of a roughness curve (RΔq) is in the range of 0.04 to 0.12, and
the arithmetic average roughness (Ra) is in the range of 0.0 μm to 0.3 μm.

Still more preferably, the variation coefficient of a root mean square slope of a roughness curve (RΔq) is in the range of 0.04 to 0.09, and
the arithmetic average roughness (Ra) is in the range of 0.0 μm to 0.2 μm.

Especially preferably, the variation coefficient of a root mean square slope of a roughness curve (RΔq) is in the range of 0.04 to 0.07, and
the arithmetic average roughness (Ra) is in the range of 0.0 μm to 0.17 μm.

Here, "RΔq" and "Ra" are in accordance with the definitions of JIS B0601 (2001) with the measurement conditions as described below.

Namely, the measurement conditions of RΔq are:
the measurement length; 0.8 μmm,
the cut-off value λc; 0.8 μmm,
the cut-off value λs; 0.0025 μmm,
the filter class; Gaussian, and
correction of the cross-sectional curve; tilt correction (entire).

Further, the RΔq values of 10 arbitrary locations inside an area of 50 μmm×50 mm are measured thereby calculating an average value and a standard deviation thereof to obtain the standard deviation/average value. This value is designated "variation coefficient of RΔq".

The measurement conditions of "Ra" are:
the measurement length; 15 μmm,
the cut-off value λs; 1 μmm,
the cut-off value λc; 3 μmm,
the filter class; Gaussian, and
correction of the cross-sectional curve; tilt correction (entire).

Further, the Ra values of 5 arbitrary locations inside an area of 50 μmm×50 μmm are measured to obtain the average value thereof. This value is designated "Ra".

According to the preferred embodiment of the present invention, "Ra" is preferably in the range of 0.0 μm to 0.3 μm.

The glaze layer surface according to the present invention having the properties described above can give the matte surface with an excellent texture. This texture gives not only a soft and warm feeling but also a moisturized and high quality feeling to the people who see it. The tactual feeling can be improved as well. Namely, according to the present invention, a glaze layer having a matte surface that can give a pleasant texture to a user visually and tactually can be realized. Assessment of the texture like this can be done by how much this appeals to a user's sense; thus, for assessment of this, as described in Examples to be described later, there is no way but by a so-called sensory test. By this sensory test, the inventors of the present invention confirmed that the matte surface realized by the present invention can be felt by people's visual and tactual sense clearly different from the conventional matte surface.

The surface of the glaze layer according to the present invention is specified by the properties mentioned above; but to dare to explain the meaning of these numbers descriptively, it may be that in the surface having the above-mentioned properties, the variations in a microscopic convex-concave shape as well as in a macroscopic undulation of the surface are so small within the specified glossiness range, thereby giving the surface with a highly uniform and fine texture. It may be further explained that presumably because of this, a high diffusion of a light, namely, a wide spread of a light is realized. However, the inventors of the present invention presume that the action effect that the surface controlled in this way gives not only a soft and warm feeling but also a moisturized and high quality feeling to the people who see it can neither be directly obtained from the numbers showing these properties nor from the descriptive explanation; namely this action effect was unexpected to the inventors of the present invention.

According to the preferred embodiment of the present invention, an air bubble amount in the glaze layer of the article according to the present invention is controlled. The air bubbles are included in the glaze layer in the production process thereof. The air bubble amount in the glaze layer can be controlled by composition of the glaze layer, baking condition thereof, and the like (these will be described later). By so doing, the shape of the surface in the glaze layer, especially the convex-concave shape thereof, can be readily controlled.

Figure 2:
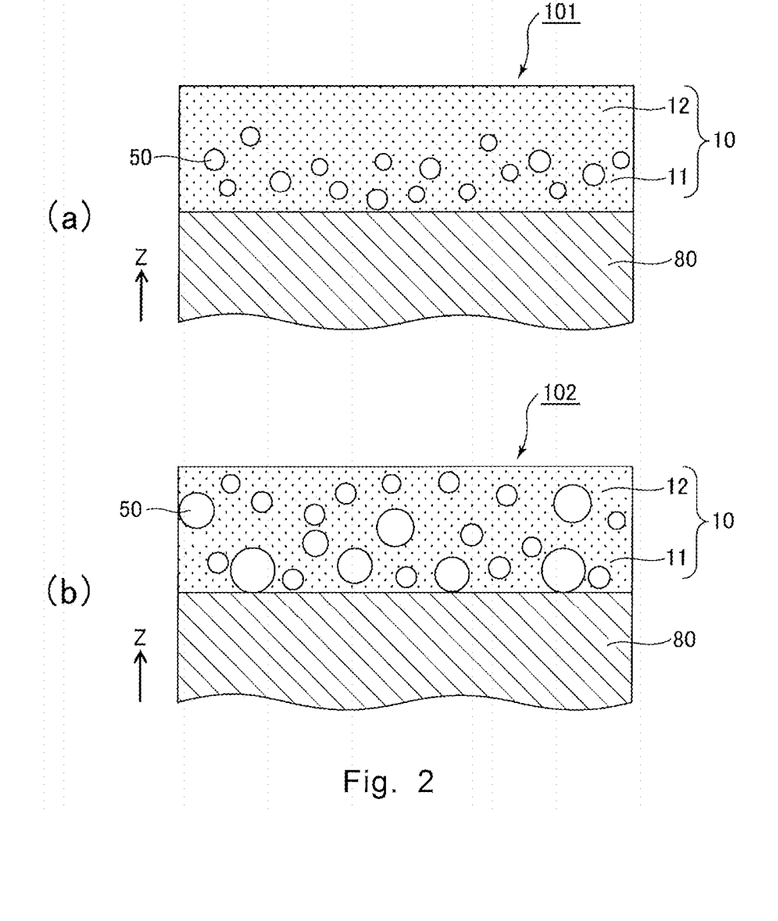
FIG. 2 is a schematic cross-sectional view to explain the article according to the present invention.

FIG. 2(a) and FIG. 2(b) are the schematic cross-sectional views to explain the embodiment with regard to how the glaze layer of the article according to the present invention includes air bubbles. In this embodiment, the glaze layers 10 that are formed in an article 101 and an article 102 have a first portion 11 in the side to a substrate surface 80a and a second portion 12 in the side to a glaze layer surface 10a. The first portion 11 includes air bubbles 50; the amount of the air bubbles 50 is designated as a first amount (>0). The second portion 12 does not include air bubbles, or the amount thereof is smaller than the first amount, if the air bubbles are included therein. FIG. 2(a) illustrates the embodiment that the second portion 12 does not include the air bubbles, and FIG. 2(b) illustrates the embodiment that the second portion 12 includes the air bubbles but the amount therein is smaller than the first amount in the first portion 11.

In this embodiment according to the present invention, on the basis of measurement under prescribed conditions, in the surface of the glaze layer, a ratio of the area of the air bubbles having a diameter of 20 μm or less (equivalent circle diameter) to the surface area (namely an air bubble area rate) is preferably in the range of 0.0% or more to less than 2.0%, while more preferably in the range of 0.0% or more to less than 1.8%. Within this range, a further merit can be enjoyed that a decrease in cleaning performance thereof due to penetration of dirt into inside of the air bubble can be prevented.

The measurement conditions of the air bubbles that are exposing to the glaze layer surface are as follows. The picture of the air bubbles present in the glaze layer surface is taken by using a laser microscope (for example, LEXT OLS-4500; manufactured by Olympus Corp.). Observation with the microscope is done with the magnification of 430 and with the observation area size of greater than 2 μmm×2 μmm per one sample, as the observation conditions. At this moment, the brightness and contrast are adjusted such that the air bubbles in the surface may be seen most clearly. From the picture thus taken, the air bubble area rate is calculated by using the image processing software (WinROOF 2015; manufactured by Mitani Corp.). First, the picture taken by the laser microscope is incorporated into the software; and then, this is processed with a monochromic image processing followed by a binary coded processing. The threshold of the binary coded processing is appropriately set such that the intended air bubbles can be chosen. In order to enhance an analysis accuracy of the air bubble area rate, for example, "cavity-filling treatment", the treatment to choose the entire portion in which the air bubbles appears to be present, may be carried out as needed. Next, the equivalent circle diameter and the area rate are calculated by the shape characteristic treatment. Finally, a sum of the area rate of the air bubbles having the equivalent circle diameter of 20 μm or more is calculated to obtain the air bubble area rate.

According to the preferred embodiment of the present invention, in the glaze layer that is provided in a sanitary ware according to the present invention, the properties of the surface thereof represented by Rz and Rsk, which are stipulated in JIS B0601 (2001) and are measured under the conditions stipulated in JIS B0633 (2001), are:

preferably 1.4 μm≤Rz<2.4 μm and −1.1<Rsk<0.2, while more preferably 1.5 μm≤Rz<2.4 μm and −1.0<Rsk<0.1.

When having the properties described above, the glaze layer surface according to the preferred embodiment of the present invention becomes a matte surface having an excellent cleaning property. According to the finding of the inventors of the present invention with regard to the convex-concave in the glaze layer that can realize the matte surface, deterioration in a dirt removal performance is not so significant in the glossy surface whose glossiness is more than 80, but when the glossiness becomes less than 50, the dirt removal performance tends to deteriorate even though the matte appearance can be obtained. Probably, the dirt enters into the convex-concave structure, so that it becomes difficult to remove the dirt, or that a high cleaning load is necessary to remove the dirt. In the preferred embodiment according to the present invention, even in the glaze layer surface having a low glossiness such as less than 50, it was found that, by bringing the surface's Rz and Rsk into within the prescribed range as mentioned above, the dirt attached once to the surface could be readily removed, namely, a high cleaning property could be obtained. In this embodiment, the cleaning property thereof is not inferior to the glossy surface having the glossiness of more than 80.

Composition of the Glaze Layer

According to the present invention, in various glaze layers, namely, in the glaze layers that are understood by those ordinarily skilled in the art, the matte surface having the properties mentioned above can be realized. In the present invention, the glaze layer may have any compositions that are generally understood by those ordinarily skilled in the art as the glaze layer so far as the properties mentioned above can be realized on the surface thereof.

According to the preferred embodiment of the present invention, the composition of the glaze layer is as described in the below table in terms of the oxides.

TABLE 1

| Chemical formula | Composition range (% by weight) |
| --- | --- |
| $SiO_2$ | 50~85 |
| $Al_2O_3$ | 5~25 |
| CaO | 0~25 |

TABLE 1-continued

| Chemical formula | Composition range (% by weight) |
| --- | --- |
| MgO | 0~25 |
| $K_2O$ | 0~5 |
| $Na_2O$ | 0~5 |

According to still another embodiment of the present invention, the glaze layer may further include, besides the components that are described in the table, $Fe_2O_3$, ZrO, ZnO, $TiO_2$, BaO, $B_2O_3$, LiO, $Sb_2O_3$, CuO, MnO, NiO, CoO, $MoO_3$, $SnO_2$, and PbO, among others.

Production of the Article

The article according to the present invention may be produced in such a way that after the glaze layer is formed on the substrate, this is processed so as to cause the surface of the glaze layer to have the surface properties as mentioned above.

In the present invention, there is no particular restriction in the glaze raw material to form the glaze layer so far as the composition of the glaze layer as described above can be realized. In general, illustrative examples of the glaze raw materials usable include a mixture of natural mineral particles of silica sand, feldspar, limestone, and the like; pigments such as a cobalt compound and an iron compound; and emulsifiers such as zirconium silicate and tin oxide. The glaze layer may be obtained by fusing the glaze raw materials at high temperature followed by rapid cooling thereof for vitrification. In the present invention, illustrative examples of the preferable glaze composition include: feldspar in the range of 10 to 30% by weight; silica sand in the range of 15 to 40% by weight; calcium carbonate in the range of 10 to 25% by weight; corundum, talc, dolomite, and zinc oxide each in the range of 10% or less by weight; and the sum of the emulsifier and the pigment in the range of 15% or less by weight. The glaze like this is applied onto the substrate, followed by drying and then baking to obtain the article. The baking is done preferably in the temperature range of 1000 to 1300° C., at which temperature the glaze softens.

In the present invention, the surface properties of the glaze layer as mentioned above can be realized preferably by a wet blast treatment. In the wet blast treatment, a mixture of water, an abrading material, and a compressed air is simultaneously jetted to the surface of the glaze layer, so that the surface is scraped to generate the intended surface state. The matte surface according to the present invention may be obtained by appropriately selecting the abrading material, the average particle diameter thereof, the supply pressure of the compressed air, the jetting distance, the jetting angle, the jetting time, and the like. According to the preferred embodiment of the present invention, it is preferable to use, as the abrading material, non-spherical alumina particles with the particle diameter in the range of 1 to 100 μm.

EXAMPLES

Examples 1 to 4 and Example 23 (Examples of the Present Invention), and Example 22 (Comparative Example)

A sanitary ware (White #NW1; manufactured by Toto Ltd.) was prepared, and the flat portion thereof was cut out to the size of an about 10 cm square to obtain the sample for assessment. The glaze layer of this sample was formed of one layer including a mixture of a glass and a pigment.

The glaze layer surface of the substrate described above was treated with a commercially available wet blasting device. Non-spherical alumina particles were used as the abrading material, the particle diameter at a value of D50 of which was chosen from the range of 1 to 100 μm. Upon carrying out the treatment, the supply pressure of the compressed air, the jetting distance, the jetting angle, and the jetting time were appropriately selected. By so doing, 5 samples of Examples 1 to 4, Example 22, and Example 23 were obtained.

Examples 5 to 10 (Comparative Examples)

A flat portion of each of the commercially available matte sanitary ware described in the below table was cut to the size of about 5 to 10 cm square to obtain the sample examples 5 to 10.

TABLE 2

| Example | Manufacturer | Color code |
|---|---|---|
| 5 | Company A | Matt White |
| 6 | Company B | White Matt |
| 7 | Company C | White Satin Matt |
| 8 | Company D | Milky White |
| 9 | Company E | Matt White |
| 10 | Company F | Silk matt White |

Examples 11 to 21 (Comparative Examples)

Natural mineral particles (2 kg), 1 kg of water, and 4 kg of ball stones were taken into a 6-L ceramic-made pot, and then, they were crushed by a ball mill for about 24 hours to obtain the glaze slurry. Next, a plate-like test piece having the size of 70×70 μmm was prepared by using a base mad for a sanitary ware prepared from silica sand, feldspar, clay, and so forth as raw materials. The glaze was applied onto the plate-like test piece by spray coating based on a wet blow method so as to give the thickness of 0.5 μmm, which was then followed by baking at 1100 to 1200° C. This was then cooled from the bake temperature to a room temperature with appropriately controlling the temperature descending time to obtain the samples of Examples 11 to 21. The compositions of the glaze layers of Examples 11 to 22 are summarized in Table 3.

TABLE 3

| | Composition in terms of oxides (% by weight) | | | | | | |
|---|---|---|---|---|---|---|---|
| Example | $SiO_2$ | $Al_2O_3$ | CaO | MgO | ZnO | $K_2O$ | $Na_2O$ |
| 11-14 | 64.4 | 8.7 | 12.7 | 7.1 | 4.1 | 2.3 | 0.7 |
| 15-21 | 65.7 | 8.1 | 12.2 | 7.2 | 3.8 | 2.3 | 0.7 |

Measurement of Surface Properties
(1) Variation Coefficient of Root Mean Square Slope of Roughness Curve (RΔq)

By using a stylus type surface roughness tester (SV-3200; manufactured by Mitutoyo Corp.) in accordance with JIS B0651 (2001), the variation coefficient of a root mean square slope of a roughness (RΔq) curve in each of the samples in Examples 1 to 23 was calculated in accordance with the definition and description in JIS B0601 (2001). The measurement conditions thereof were: the measurement length; 0.8 μmm, the cut-off value λc; 0.8 μmm, the cut-off value λs; 0.0025 μmm, the filter class; Gaussian, and correction of the cross-sectional curve; tilt correction (entire). The RΔq values of total 10 locations inside an area of 50 μmm×50 μmm were measured to calculate an average value and a standard deviation thereof to obtain the variation coefficient (=standard deviation/average value). The results are summarized in the table to be described later.

(2) Arithmetic Average Roughness of Roughness Curve (Ra)

By using a stylus type surface roughness tester (SV-3200; manufactured by Mitutoyo Corp.) in accordance with JIS B0651 (2001), the arithmetic average roughness of a roughness curve (Ra) in each of the samples in Examples 1 to 23 was calculated in accordance with the definition and description in JIS B0601 (2001). The measurement conditions thereof were: the measurement length; 15 μmm, the cut-off value λs; 1 μmm, the cut-off value λc; 3 μmm, the filter class; Gaussian, and correction of the cross-sectional curve; tilt correction (entire). The Ra values of total 5 locations inside an area of 50 μmm×50 μmm were measured to calculate an average value thereof. The results are summarized in the table to be described later.

(3) Measurements of Surface Properties (Rsk, Rz, RSm, and Rc)

By using a stylus type surface roughness tester (SV-3200; manufactured by Mitutoyo Corp.) in accordance with JIS B0651 (2001), the surface roughness parameters (Rsk, Rz, RSm, and Rc) of each of the samples in Examples 1 to 23 were calculated in accordance with the definition and description in JIS B0601 (2001). The measurement conditions thereof in accordance with the stipulation in JIS B0633 (2001) were: the measurement length; 4 μmm, the cut-off value λc; 0.8 μmm, the cut-off value λs; 0.0025 mm, the filter class; Gaussian, and correction of the cross-sectional curve; tilt correction (entire). The line roughnesses of total 10 locations inside an area of 50 μmm×50 μmm were measured to calculate an average value thereof, which was taken as the parameters of the roughness of the sample. The results are summarized in the table to be described later.

Measurement of Glossiness

By using a glossiness meter (GM-268 plus; manufactured by Konica Minolta Corp.), the 60° glossiness of each sample of Examples 1 to 23 was measured in accordance with JIS Z8741. The results are summarized in the table to be described later.

(5) Measurement of Air Bubbles Exposing to Surface

Figure 3:
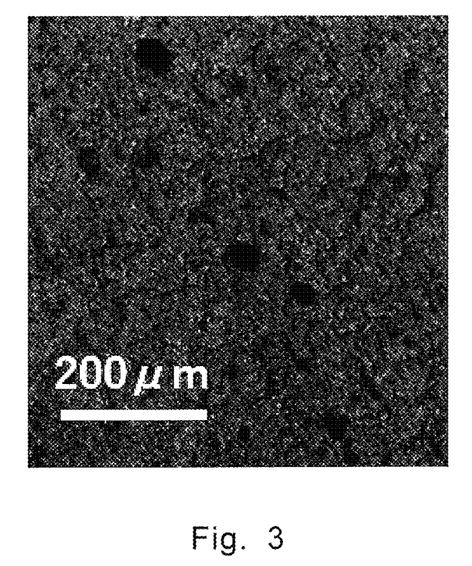
FIG. 3 is a picture of the glaze layer surface of the sanitary ware observed by a laser microscope that is Example of the article according to the present invention.

The picture of the air bubbles present in the surface of the glaze layer was taken by using a laser microscope (LEXT OLS-4500; manufactured by Olympus Corp.). The composition of the laser microscope used in the measurement is described below. Observation with the laser microscope is done with the magnification of 430 and with the observation area size of greater than or equal to 2 μmm×2 μmm per one sample, as the observation conditions. At this moment, the brightness and contrast were adjusted such that the air bubbles in the surface might be seen most clearly. The picture of the glaze layer of Example 23 taken by the laser microscope is displayed in FIG. 3, as one example of this.
Laser Microscope
  Apparatus: OLS 4500
  Product version: 1.1.8
  Light source: 405-nm semiconductor laser
  Detection system: photo-multiplayer
  Objective lens: OLYMPUS MPlan APO N 50X/0.95 LEXT From the picture thus taken, the air bubble area rate was calculated by using the image processing software (Win-ROOF 2015; manufactured by Mitani Corp.). First, the picture taken by the laser microscope was incorporated into the software; and then, this was processed with a monochromic image processing followed by a binary coded processing. The threshold of the binary coded processing was appropriately set such that the air bubbles having the diameter thereof in the range about 10 μm or more could be chosen. Next, the equivalent circle diameter and the area rate were calculated by the shape characteristic treatment. Then, a sum of the area rate of the air bubbles having the equivalent circle diameter of 20 μm or more was calculated to obtain the air bubble area rate.

The results are summarized in Table 4 to be described later.

(6) Assessment of Cleaning Property to Oily Dirt

Cleaning property of the surface of each of 1 to 23 to an oily solid was assessed in the way as described below. Spectrophotometer CM-2600d (manufactured by Konica Minolta Corp.) was used as the color difference meter. The measurement was done with the following conditions: color system; L*a*b*, mask/gloss; S/I+E, UV setting: UV 100%, light source; D65, observation view field; 10 degrees; display; an average value of 3 μmeasurements at the same position using the absolute color difference was used as the a* value displayed in SCI including a specular reflection.
  (a) The value of a* on the sample surface measured by the color difference meter was taken as a0*. The measurement fluctuation due to bleeding was prevented by covering a line with a white mask having a 5-mm width. At the time of a* measurement including the following measurements, this preventive measures to the fluctuation was taken.
  (b) A 3-mm width line was drawn on the sample by using a red Craypas (registered trade mark), and then, a* on the line was measured with the color difference meter. This value was taken as a1*.
  (c) The sample was wiped by a commercially available toilet-cleaning sheet (Toilet Quickle (trade name) manufactured by Kao Corp.; "Quickle" is a trade mark of Kao Corp.) reciprocally for 30 times with applying a load of 25 g/cm$^2$ in a perpendicular direction to the line.
  (d) The color of the Craypas line on the sample after wiping was measured by the color difference meter. This value was taken as a2*.
  (e) The dirt removal performance was calculated by the following formula.
  Dirt removal performance (%)=(a1*−a2*)/(a1*−a0*)
  The results are summarized in the table to be described later.

Sensory Assessment of Visual Texture of the Matte Surface

Sensory assessments of the visual textures of Examples 1 to 23 were carried out in the way as described below.
(1) Preliminary Test
In order to assess the texture of the matte member, keywords to more specifically express the texture that controls "high quality", the abstract concept of the matte member were extracted. Twelve keywords selected were "rough", "smooth", "shiny", "soft", "tough", "cool", "warm", "light", "profound", "natural", "clean", and "chic". On top of these, the keyword "high quality" was added to obtain 13 keywords in total. Eleven commercially available white matte materials were scored with 1 to 5 points to each keyword. As a result, it was found the keyword that was most highly correlated to "high quality" was "soft".

(2) Sensory Test

By using the specific keyword "softness" as the indicator to assess "high quality" of the matte material, the sensory assessment with regard to "high quality" was carried out in various matte sanitary ware. Specifically, the assessment was carried out by the following procedure. Ten panelists (subjects) were chosen independent of the age and gender.
  1) Similarly to Examples 1 to 23, a flat plate with the vertical-horizontal size of 50 μmm square was prepared as the sample for assessment. The area of a 5-mm width from the edge of the sample was masked with a black tape.
  2) The assessment was carried out by using a light source of D65 under an environment in a texture-assessment booth (GTI MiniMatcher (registered trade mark) Model MM-2e; manufactured by GTI Graphic Technology Inc.).
  3) The sample was placed in the texture-assessment booth and was kept under the state in which the subject can hold it freely in his hands. The light source was reflected to the sample surface under the state in which the distance between the sample surface and the subject's eye was kept 40 to 50 cm. Then, the texture that was felt in the portion where the highlight (reflected light) was spread and in the portion around this was assessed.

By using "high quality" and "softness" as the assessment indicators, scores of 1 to 5 points were given to each of them. The numbers of the subjects who gave the score of 4 points or more to each sample were counted. The results are summarized in the table to be described later.

Tactual Sensory Assessment of the Matte Surface

Tactual sensory assessments of Examples 1 to 23 were carried out in the way as described below.
  1) A flat plate with the vertical-horizontal size of 50 μmm square was prepared as the sample for assessment. Ten panelists (subjects) were chosen independent of the age and gender.
  2) With the eyes closed, the sample surface was touched with the finger cushion, and the finger was moved reciprocally to assess "tactual feeling" with the scores of 1 to 5 points. The numbers of the subjects who gave the score of 4 points or more to each sample were counted. The results are summarized in the table described below.

TABLE 4

| | | Functional assessment | | | | | | | | | | Air bubble area rate (%) | Dirt removal performance (%) |
|---|---|---|---|---|---|---|---|---|---|---|---|---|---|
| Example | | High Quality (person) | Softness (person) | Tactile feel (person) | 60° Glossiness | Variation coefficient of R$\Delta$q | Ra (μm) | Rz (μm) | Rsk (μm) | Rc (μm) | RSm (μm) | Rc/RSm | | |
| 1 | Example | 10 | 8 | 8 | 21 | 0.048 | 0.13 | 2.3 | 0.0 | 1.3 | 67.9 | 0.019 | 1.6 | 92 |
| 2 | Example | 10 | 8 | 9 | 23 | 0.063 | 0.17 | 2.3 | −0.1 | 1.3 | 79.1 | 0.017 | 1.2 | 94 |
| 3 | Example | 10 | 8 | 9 | 28 | 0.069 | 0.12 | 2.1 | 0.0 | 1.1 | 70.2 | 0.016 | 0.4 | 96 |

TABLE 4-continued

| Example | | Functional assessment | | | 60° Glossiness | Variation coefficient of RΔq | Ra (μm) | Rz (μm) | Rsk (μm) | Rc (μm) | RSm (μm) | Rc/RSm | Air bubble area rate (%) | Dirt removal performance (%) |
|---|---|---|---|---|---|---|---|---|---|---|---|---|---|---|
| | | High Quality (person) | Softness (person) | Tactile feel (person) | | | | | | | | | | |
| 4 | Example | 10 | 7 | 7 | 49 | 0.085 | 0.18 | 1.5 | −0.4 | 0.9 | 131.5 | 0.007 | 0.8 | 97 |
| 5 | Comparative Example | 0 | 0 | 3 | 25 | 0.080 | 0.83 | 4.1 | −0.6 | 2.3 | 147.7 | 0.016 | 0.8 | 88 |
| 6 | Comparative Example | 4 | 0 | 0 | 17 | 0.185 | 0.83 | 6.6 | −1.2 | 4.6 | 194.4 | 0.024 | 0,2 | 83 |
| 7 | Comparative Example | 2 | 1 | 3 | 19 | 0.134 | 0.51 | 4.4 | −1.0 | 2.6 | 181.5 | 0.015 | 0.9 | 82 |
| 8 | Comparative Example | 2 | 1 | 1 | 13 | 0.107 | 0.35 | 5.8 | −1.0 | 3.9 | 194.0 | 0.020 | 1.0 | 81 |
| 9 | Comparative Example | 2 | 1 | 4 | 33 | 0.177 | 0.37 | 3.5 | −0.3 | 2.9 | 253.6 | 0.011 | 1.2 | 86 |
| 10 | Comparative Example | 1 | 1 | 2 | 22 | 0.147 | 0.48 | 11.0 | −1.2 | 5.0 | 40.3 | 0.123 | 0.9 | 84 |
| 11 | Comparative Example | 2 | 1 | 0 | 10 | 0.084 | 0.52 | 5.2 | −0.8 | 3.2 | 142.0 | 0.022 | 1.2 | 66 |
| 12 | Comparative Example | 0 | 0 | 0 | 15 | 0.085 | 1.04 | 3.2 | −0.5 | 1.9 | 87.7 | 0.021 | 1.1 | 82 |
| 13 | Comparative Example | 3 | 2 | 3 | 18 | 0.122 | 0.29 | 3.5 | −0.5 | 2.2 | 126.7 | 0.017 | 0.3 | 88 |
| 14 | Comparative Example | 3 | 2 | 3 | 30 | 0.219 | 0.30 | 3.9 | −0.1 | 2.7 | 185.6 | 0.014 | 0.4 | 88 |
| 15 | Comparative Example | 0 | 0 | 0 | 8 | 0.230 | 0.35 | 8.9 | −1.1 | 4.9 | 95.1 | 0.051 | 0.7 | 76 |
| 16 | Comparative Example | 3 | 2 | 3 | 22 | 0.160 | 0.31 | 4.3 | −0.6 | 2.7 | 133.1 | 0.020 | 0.9 | 80 |
| 17 | Comparative Example | 3 | 2 | 3 | 26 | 0.152 | 0.30 | 4.3 | −0.5 | 2.6 | 173.0 | 0.015 | 0.5 | 82 |
| 18 | Comparative Example | 3 | 2 | 3 | 30 | 0.131 | 0.32 | 4.7 | −1.0 | 3.0 | 203.7 | 0.015 | 0.5 | 83 |
| 19 | Comparative Example | 3 | 2 | 4 | 36 | 0.127 | 0.33 | 4.0 | −1.0 | 2.8 | 238.8 | 0.012 | 0.8 | 87 |
| 20 | Comparative Example | 3 | 2 | 4 | 48 | 0.197 | 0.34 | 2.9 | −0.3 | 1.8 | 219.0 | 0.008 | 0.3 | 88 |
| 21 | Comparative Example | 3 | 2 | 2 | 55 | 0.153 | 0.32 | 2.2 | 0.1 | 1.5 | 246.0 | 0.006 | 0.2 | 96 |
| 22 | Comparative Example | 0 | 0 | 0 | 23 | 0.071 | 2.69 | 24.2 | −0.1 | 17.0 | 286.7 | 0.059 | 4.0 | 68 |
| 23 | Example | 10 | 8 | 9 | 24 | 0.045 | 0.21 | 2.2 | −0.2 | 1.2 | 74.0 | 0.016 | 2.0 | 87 |

What is claimed is:

1. An article comprising:
   a substrate and a glaze layer formed on a surface of the substrate;
   the surface of the glaze layer has:
   a 60° glossiness being in the range of more than 20 to 50 or less; and
   by using a stylus type surface roughness tester in accordance with JIS B0651(2001) and are stipulated in accordance with JIS B0601 (2001);
   a variation coefficient of a root mean square slope of a roughness curve (RΔq) being in the range of 0.04 to 0.1; and
   an arithmetic average roughness (Ra) being in the range of 0.0 μm to 0.5 μm, where
   measurement conditions to obtain the variation coefficient of RΔq are: an assessment length; 0.8 μmm, a cut-off value kc; 0.8 μmm, a cut-off value λs; 0.0025 μmm, a filter class; Gaussian, correction of a cross-sectional curve; tilt correction (entire), and the RΔq values of 10 arbitrary locations inside an area of 50 μmm×50 μmm are measured thereby calculating an average value and a standard deviation thereof to obtain the standard deviation/average value as the coefficient; and
   measurement conditions to obtain the Ra value are: an assessment length; 15 μmm, a cut-off value λs; 1 μmm, a cut-off value kc; 3 μmm, a filter class; Gaussian, correction of a cross-sectional curve; tilt correction (entire); and the Ra values of 5 arbitrary locations inside an area of 50 μmm×50 mm are measured to obtain the average value thereof as the Ra value.

2. The article according to claim 1, wherein the arithmetic average roughness (Ra) is in the range of 0.0 μm to 0.3 μm.

3. The article according to claim 1, wherein an air bubble area rate in the surface is in the range of 0.0% or more to less than 2.0%.

4. The article according to claim 3, wherein Rz of the surface is 1.4 μm≤Rz<2.4 μm, and Rsk of the surface is −1.1<Rsk<0.2, where Rz and Rsk are stipulated in JIS B0601 (2001) and are measured under the conditions stipulated in JIS B0633 (2001).

5. The article according to claim 2, wherein an air bubble area rate in the surface is in the range of 0.0% or more to less than 2.0%.

6. The article according to claim 5, wherein Rz of the surface is 1.4 μm≤Rz<2.4 μm, and Rsk of the surface is −1.1<Rsk<0.2, where Rz and Rsk are stipulated in JIS B0601 (2001) and are measured under the conditions stipulated in JIS B0633 (2001).

7. A method of production of the article according to claim 1, the method comprising:

preparing the article comprising a glaze layer; and
treating a surface of the glaze layer with wet blasting.

8. A method of production of the article according to claim 2, the method comprising:
preparing the article comprising a glaze layer; and
treating a surface of the glaze layer with wet blasting.

9. A method of production of the article according to claim 3, the method comprising:
preparing the article comprising a glaze layer; and
treating a surface of the glaze layer with wet blasting.

10. A method of production of the article according to claim 4, the method comprising:
preparing the article comprising a glaze layer; and
treating a surface of the glaze layer with wet blasting.

11. A method of production of the article according to claim 5, the method comprising:
preparing the article comprising a glaze layer; and
treating a surface of the glaze layer with wet blasting.

12. A method of production of the article according to claim 6, the method comprising:
preparing the article comprising a glaze layer; and
treating a surface of the glaze layer with wet blasting.

13. The article according to claim 1, wherein the article is an enameled product or a ceramic product.

* * * * *